United States Patent
Kim et al.

(10) Patent No.: US 12,123,789 B2
(45) Date of Patent: Oct. 22, 2024

(54) METHOD AND DEVICE FOR TEMPERATURE DETECTION AND THERMAL MANAGEMENT BASED ON POWER MEASUREMENT

(71) Applicant: SAMSUNG ELECTRONICS CO., LTD., Suwon-si (KR)

(72) Inventors: Byungsu Kim, Seoul (KR); Yunhyeok Im, Hwaseong-si (KR); Inhwan Baek, Hwaseong-si (KR); Dongsuk Shin, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 622 days.

(21) Appl. No.: 17/366,348

(22) Filed: Jul. 2, 2021

(65) Prior Publication Data
US 2022/0136909 A1    May 5, 2022

(30) Foreign Application Priority Data

Nov. 2, 2020    (KR) .......................... 10-2020-0144597

(51) Int. Cl.
*G01K 7/42*        (2006.01)
*G05D 23/19*       (2006.01)
(Continued)

(52) U.S. Cl.
CPC .............. *G01K 7/425* (2013.01); *G01K 7/42* (2013.01); *G05D 23/19* (2013.01); *G06F 1/206* (2013.01);
(Continued)

(58) Field of Classification Search
CPC .......... G01K 7/425; G01K 7/42; G05D 23/19; G06F 1/206; G06F 1/3206; G06F 1/3296;
(Continued)

(56) References Cited

U.S. PATENT DOCUMENTS 7,257,464 B2 *   8/2007  Fennewald .............. H05B 1/02
                                                     700/297
7,464,278 B2 * 12/2008  Cohen .................. G05B 13/026
                                                     713/320
(Continued)

FOREIGN PATENT DOCUMENTS

JP     2017-021513      1/2017
KR  10-2020-0029082     3/2020

OTHER PUBLICATIONS

Kalyanam, et al., "Randomized Pulse-Modulating Instruction-Issue Control Circuit for a Current and Temperature Limiting System in a 7nm Hexagon™ Compute DSP", 4 pages.

(Continued)

*Primary Examiner* — Nathaniel T Woodward
*Assistant Examiner* — Philip L Cotey
(74) *Attorney, Agent, or Firm* — F. CHAU & ASSOCIATES, LLC

(57) ABSTRACT

The present disclosure provides a device and methods to control a temperature of an integrated circuit (IC). For example, a device may include a circuit (e.g., an IC), a power monitor, a temperature sensor, and a controller. In some examples, temperature may be estimated based on power measured by a dynamic power monitor (DPM). In some cases, the estimated temperatures may be corrected based on temperature sensed by a temperature sensor on the IC. The power may be measured in shorter time periods and/or more frequent time periods compared to a time periods that the temperature sensor senses temperature. Accordingly, the temperature of an IC may be detected and adjusted more frequently based on the power measurements, and the temperature estimates may be adjusted for accuracy based on sensed temperatures.

13 Claims, 10 Drawing Sheets

(51) Int. Cl.
*G06F 1/20* (2006.01)
*G06F 1/3206* (2019.01)
*G06F 1/3296* (2019.01)
*G06F 11/30* (2006.01)
*G06F 1/28* (2006.01)
*G06F 1/3237* (2019.01)
*G06F 1/324* (2019.01)
*G06F 123/02* (2023.01)
*G06N 20/00* (2019.01)

(52) U.S. Cl.
CPC .......... *G06F 1/3206* (2013.01); *G06F 1/3296* (2013.01); *G06F 11/3058* (2013.01); *G06F 1/28* (2013.01); *G06F 1/3237* (2013.01); *G06F 1/324* (2013.01); *G06F 11/3062* (2013.01); *G06F 2123/02* (2023.01); *G06N 20/00* (2019.01); *Y02D 10/00* (2018.01)

(58) Field of Classification Search
CPC ...... G06F 11/3058; G06F 1/28; G06F 1/3237; G06F 1/324; G06F 11/3062; G06F 2123/02; G06N 20/00; Y02D 10/00
See application file for complete search history.

(56) References Cited

U.S. PATENT DOCUMENTS

| | | | | |
|---|---|---|---|---|
| RE42,195 E | * | 3/2011 | Bash | F24F 11/30 62/177 |
| 8,766,704 B2 | * | 7/2014 | Takayanagi | H03K 19/00369 327/513 |
| 8,930,724 B2 | * | 1/2015 | Jung | G06F 1/324 713/300 |
| 9,037,882 B2 | * | 5/2015 | Vadakkanmaruveedu | G06F 1/206 713/300 |
| 9,903,764 B2 | * | 2/2018 | Lee | G01K 7/425 |
| 10,061,331 B2 | * | 8/2018 | Saeidi | G06F 1/3296 |
| 10,309,833 B2 | * | 6/2019 | Stevens | G01N 21/35 |
| 10,309,838 B2 | | 6/2019 | Merrikh et al. | |
| 10,474,209 B2 | * | 11/2019 | Park | G06F 1/206 |
| 10,588,043 B2 | * | 3/2020 | Kocagoez | H04W 24/08 |
| 10,884,475 B1 | * | 1/2021 | Wang | G06F 1/3296 |
| 10,936,030 B2 | * | 3/2021 | Kim | G06F 1/3296 |
| 2012/0053897 A1 | * | 3/2012 | Naffziger | G06F 1/3206 702/182 |
| 2013/0235689 A1 | * | 9/2013 | Koyama | G11C 7/00 365/227 |
| 2014/0164800 A1 | * | 6/2014 | Chang | G06F 1/206 713/322 |
| 2016/0092617 A1 | * | 3/2016 | Lee | G01K 1/026 703/6 |
| 2018/0005687 A1 | * | 1/2018 | Kawabe | G11C 11/406 |
| 2018/0038611 A1 | * | 2/2018 | Lau | G05D 23/1931 |
| 2018/0321718 A1 | * | 11/2018 | Kaundinya | G06F 1/206 |
| 2020/0021502 A1 | * | 1/2020 | Bernat | G06F 9/5094 |
| 2020/0132774 A1 | * | 4/2020 | Hara | H02J 7/0048 |
| 2021/0116955 A1 | | 4/2021 | Kim et al. | |

OTHER PUBLICATIONS

Wolf, "Processors and Systems", Thermal Capacitance—an overview; ScienceDirect Topics, 16 pages.

Touzelbaev, et al., "High-Efficiency Transient Temperature Calculations for Applications in Dynamic Thermal Management of Electronic Devices", Journal of Electronic Packaging, Sep. 2013, vol. 135, pp. 031001-1-031001-8.

* cited by examiner

| VDD Magnitude | CLK Frequency | Coefficients | |
|---|---|---|---|
| | | $a_1$ | $a_2$ |
| V1 | f1 | X11 | Y11 |
| V1 | f2 | X12 | Y12 |
| ⋮ | ⋮ | ⋮ | ⋮ |
| V2 | f1 | X21 | Y21 |
| V2 | f2 | X22 | Y22 |
| ⋮ | ⋮ | ⋮ | ⋮ |

```
11  While (T_DET > THR_1) {
12      If (P_MEA > THR_2)
13          Reduce power consumption of circuit
14      Else
15          Increase power consumption of circuit
16      End
17
18      If (T_DET - T_DET' > THR_3)
19          THR_2 = THR_2 - u
20      Else
21          THR_2 = THR_2 + u
22      End
23  }
```

METHOD AND DEVICE FOR TEMPERATURE DETECTION AND THERMAL MANAGEMENT BASED ON POWER MEASUREMENT

CROSS-REFERENCE TO RELATED APPLICATION

This application is based on and claims priority under 35 U.S.C. § 119 to Korean Patent Application No. 10-2020-0144597, filed on Nov. 2, 2020, in the Korean Intellectual Property Office, the disclosure of which is incorporated by reference herein in its entirety.

BACKGROUND

The inventive concept relates to thermal management of a device, and more particularly, to a method and a device for temperature detection and device thermal management based on power measurement.

User devices may include one or more integrated circuits (ICs) to perform various processing operations for user device functionality. An IC may include one or more electronic circuits located on a chip, called a system-on-chip. ICs are used to perform computer processing and calculations related to an input to a computer (e.g., ICs may perform processing operations in response to user input). Mobile phones, computers, GPS devices, and tablets may use ICs for processing, storage, and computer calculations, among other uses. In some cases, ICs include temperature sensors that are used to determine the temperate of components of the IC.

A temperature sensor may be a small device that is used to detect a surface temperature of an IC or a core (e.g., inner) temperature of an IC. In some cases, a temperature sensor may detect a combination of surface temperatures and core temperatures of an IC. The sensed temperature may then be used to adjust the temperature the IC with the use of fans, fluid, or power reduction, among other temperature control methods.

In some cases, power applied to the IC may influence the temperature of the IC. Therefore, power input and output of an IC can be monitored (e.g., and power input and output may be adjusted to adjust the temperature of the IC). A power monitor may measure the input power of an IC, the output power of an IC, or both. Dynamic power monitoring techniques may be implemented to determine power levels periodically, over time, where the timing of the monitoring may be adjusted based on a user's preferences.

In some cases (e.g., when an IC is heavily processing data), the temperature of the IC may become undesirable or unstable, which may cause damage to the IC or the user device. For example, if temperatures reach a threshold higher than a casing around a lithium-ion battery, the battery may be exposed to a moist atmosphere, resulting is an explosion. Therefore, there is a need in the art to periodically sense and accurately control the temperature of an IC.

SUMMARY

The inventive concept provides a method and a device for accurately detecting a temperature based on power measurement and optimally controlling a temperature of a device based on power and a temperature.

According to an aspect of the inventive concept, there is provided a device including a first circuit configured to operate based on first input signals; a first power monitor configured to measure a first power of the first circuit according to a first period, wherein the first power of the first circuit is measured based on the first input signals; a temperature sensor configured to sense temperature of the device according to a second period; and a controller configured to estimate a first temperature of the first circuit according to the first period, receive a second temperature from the temperature sensor according to the second period, calculate a third temperature based on (e.g., by correcting) the first temperature and the second temperature, and determine a circuit temperature of the first circuit according to the first period based at least in part on the first temperature and the third temperature, wherein the first period is shorter than the second period.

According to another aspect of the inventive concept, there is provided a method including measuring a first power of a first circuit based on input signals of the first circuit in a first period; estimating a first temperature of the first circuit based on the first power; calculating a third temperature by sensing a second temperature of a device including the first circuit and correcting the first temperature based on the second temperature in a second period; and determining a circuit temperature of the first circuit based on the first temperature and the third temperature in one or more instances of the first period, wherein the first period is shorter than the second period.

According to another aspect of the inventive concept, there is provided a device including at least one circuit configured to operate based on input signals; at least one power monitor configured to measure power of the at least one circuit based on the input signals; at least one temperature sensor configured to sense temperature of the device; and a controller configured to estimate a first temperature of the at least one circuit based on the measured power, calculate a third temperature by correcting the first temperature based on a second temperature sensed by the temperature sensor, and control a temperature of the at least one circuit based on the measured power, the first temperature, and the third temperature.

According to another aspect of the inventive concept, there is provided a method including estimating temperatures of a circuit at first time intervals according to a first period, wherein the temperatures are estimated at the first time intervals based on power consumed by the circuit; receiving temperature measurements of the circuit from a temperature sensor at second time intervals according to a second period longer than the first period; adjusting at least one of the estimated temperatures based on at least one of the received temperature measurements; and determining whether circuit temperature of the circuit satisfies a threshold at each of the first time intervals according to the first period, wherein the determination at one of the first time intervals is based on the at least one adjusted estimated temperatures.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
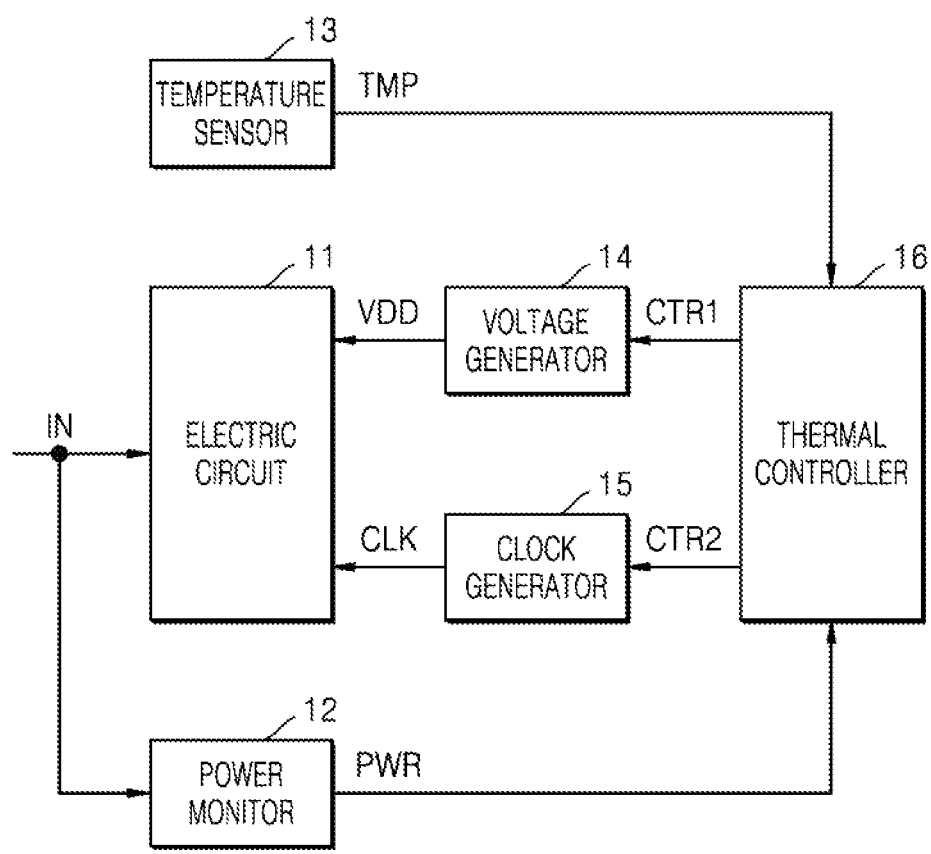
FIG. 1 is a block diagram showing a device according to an example embodiment.

User devices may include one or more integrated circuits (ICs) to perform various processing operations for user device functionality. An IC may include one or more electronic circuits located on a chip, called a system-on-chip. ICs are used to perform computer processing and calculations related to an input to a computer (e.g., ICs may perform processing operations in response to user input). Mobile phones, computers, GPS devices, and tablets may use ICs for processing, storage, and computer calculations, among other uses. In some cases, ICs include temperature sensors that are used to determine the temperate of components of the IC.

In order to control the temperature of an IC, a temperature sensor may be included in the IC. In general, a temperature sensor may detect a temperature based on a temperature characteristic of an element. However, in some cases, such temperature sensors may detect a temperature at according to a relatively long period (e.g., temperature sensors may monitor temperature less frequently than may be desirable). For instance, a temperature sensor may detect the temperature of a chip or IC at certain periods of time. The time periods may be extended (e.g., based on device settings, performance targets, etc.), supplying less frequent temperature information to control the temperature. Therefore, when the temperature of an IC is controlled based on a temperature sensed by a temperature sensor, the performance of the IC may be limited (e.g., due to excessive temperatures).

The present disclosure relates generally to a device and method for sensing a temperature of an IC. More particularly, embodiments of the present disclosure relate to a device and method for estimating and correcting a temperature of an IC.

In some embodiments, the present disclosure estimates a temperature based on power measured by a dynamic power monitor (DPM). The estimated temperature may be corrected based on a temperature sensed by a temperature sensor on the IC. In some examples, the power may be measured in shorter time periods and/or more frequent time periods compared to a traditional temperature sensor. Accordingly, the temperature of an IC may be detected and adjusted more frequently. Such may provide for finer control of IC temperature and may reduce a performance margin to comply with device temperature limits.

Embodiments of the present disclosure include a device and methods used to control a temperature of an IC. The device may include a circuit (e.g., an IC), a power monitor, a temperature sensor, and a controller. The device may estimate a first temperature of a circuit at a first time interval of a first period, where the first temperature is estimated based on power consumed by the circuit. The device may further receive a temperature measurement of the circuit from a temperature sensor at a first time interval of a second period, where the second period is longer than the first period. Accordingly, the device may estimate a second temperature of the circuit at a second time interval of the first period and adjust the second estimated temperature based on the received temperature measurement. As such, the device may determine, according to a periodicity having the shorter or reduced first period, whether circuit temperature should be adjusted.

FIG. 1 is a block diagram showing a device 10 according to an example embodiment. As shown in FIG. 1, the device 10 may include an electric circuit 11, a power monitor 12, a temperature sensor 13, a voltage generator 14, a clock generator 15, and a thermal controller 16.

The device 10 may refer to any device that includes a heat-emitting component (e.g., 13). For example, the device 10 may be an electronic system like a computing system, a memory system, a communication system, and a network system or a component included in the electronic system. In some embodiments, the device 10 may be an IC manufactured through a semiconductor process, and components of the device 10 may be included in at least one package.

The electric circuit 11 may operate based on an input signal IN. In some embodiments, the electric circuit 11 may be a processing circuit configured to process a digital signal and/or an analog signal. For example, the electric circuit 11 may include at least one of a programmable component like a central processing unit (CPU), a graphics processing unit (GPU), a neural processing unit (NPU), a component providing a fixed function like an intellectual property (IP) core, and a reconfigurable component like a field-programmable gate array (FPGA). Additionally, or alternatively, the electric circuit 11 may be a circuit block included in one of the above-described components.

The electric circuit 11 may receive a positive supply voltage VDD (may also be referred to as a supply voltage herein) from the voltage generator 14 and receive a clock signal CLK from the clock generator 15. The electric circuit 11 may use power provided through the positive supply voltage VDD and may operate in synchronization with the clock signal CLK. Therefore, the power consumption of the electric circuit 11 may depend on the positive supply voltage VDD and the clock signal CLK. For example, the power consumption of the electric circuit 11 may increase as the positive supply voltage VDD increases and may increase as the frequency of the clock signal CLK increases. Herein, the electric circuit 11 may be referred to as a circuit.

According to some aspects of the present disclosure, the power consumption of the electric circuit 11 may be used to estimate temperature of the electric circuit 11 (e.g., where more power consumed may be indicative of higher temperatures). As electric circuit 11 operates, it generates heat. For example, the temperature of the electric circuit 11 may depend on the power consumption of the electric circuit 11, such that the temperature of the electric circuit 11 may increase based on processing large data loads, performing complex operations, processing speed (e.g., clock signal CLK frequency), etc. As such, power estimates may be used to estimate temperature of the electric circuit (e.g., where the temperature estimates may be adjusted based on any temperature measurements received from a temperature sensor 13, as described in more detail herein).

According to an aspect of the inventive concept, a method of thermal management may include estimating a first temperature of a circuit at a first time interval of a first period, wherein the first temperature is estimated based on power consumed by the circuit; receiving a temperature measurement of the circuit from a temperature sensor at a first time interval of a second period, wherein the second period is longer than the first period; estimating a second temperature of the circuit at a second time interval of the first period, wherein the second temperature is estimated based on power consumed by the circuit adjusting the second estimated temperature based on the received temperature measurement; and determining, according to a periodicity having the first period, whether circuit temperature of the circuit satisfies a threshold based at least in part on the estimated first temperature and the adjusted second estimated temperature.

The power monitor 12 may receive an input signal IN provided to the electric circuit 11 and measure the power consumed by the electric circuit 11 based on the input signal IN. In some embodiments, the power monitor 12 may include a dynamic power monitor (DPM) disclosed in U.S. patent application Ser. No. 15/931,043, filed by the same applicant as the present application and incorporated herein by reference in its entirety. For example, the power monitor 12 may receive a clock gating signal and/or an enable signal as the input signal IN. The power monitor 12 may accurately and quickly measure the power consumed by the electric circuit 11 based on a clock gating signal and/or an enable signal that determines the power consumption of the electric circuit 11. As shown in FIG. 1, the power monitor 12 may provide information regarding measured power (i.e., power information PWR) to the thermal controller 16.

The temperature sensor 13 may sense the ambient temperature of the electric circuit 11 and may provide information regarding the sensed temperature (i.e., temperature information TMP) to the thermal controller 16. Herein, providing temperature information (e.g., TMP) may be expressed as providing a temperature indicated by the corresponding temperature information. The temperature sensor 13 may be provided inside the electric circuit 11 in some embodiments and may be provided around the electric circuit 11 in some other embodiments. The temperature sensor 13 may have an arbitrary structure for sensing a temperature. For example, temperature sensor 13 may detect a temperature by detecting a characteristic of an element that varies according to temperatures. Due to temperature sensing based on the characteristics of an element, as described later with reference to FIG. 3, a period in which the temperature sensor 13 provides the temperature information TMP to the thermal controller 16 (may be referred to as a second period herein) may be longer than a period in which the power monitor 12 provides the power information PWR to the thermal controller 16 (may be referred to as a first period herein).

A period may generally refer to a frequency in which time instances repeat. A time period may refer to the time taken for a complete cycle to occur. In accordance with some aspects of the present disclosure, a period may refer to the time between two measurements to be taken (e.g., by a temperature sensor or a power monitor), the time between two calculations (e.g., the time between a first temperature estimate and a second temperature estimate, the time between temperature control determinations, etc.), among other examples.

The thermal controller 16 may receive the power information PWR from the power monitor 12 and may receive the temperature information TMP of the device 10 from the temperature sensor 13. The thermal controller 16 may estimate the temperature of the electric circuit 11 based on the power information PWR and correct an estimated temperature based on the temperature information TMP. When the thermal controller 16 detects the temperature of the electric circuit 11 based on the temperature information TMP provided from the temperature sensor 13, controlling the temperature of the electric circuit 11 may excessively limit the performance of the electric circuit 11. Additionally, or alternatively, as described later with reference to FIG. 3, the thermal controller 16 may estimate a temperature based on the power information PWR, and, when the temperature information TMP is received, correct an estimated temperature. The thermal controller 16 may determine the temperature of the electric circuit 11 based on an estimated temperature and a corrected temperature. Accordingly, the thermal controller 16 may more frequently detect an exact temperature of the electric circuit 11.

The thermal controller 16 may control the temperature of the electric circuit 11 based on a detected temperature of the electric circuit 11. For example, when the detected temperature of the electric circuit 11 is low, the thermal controller 16 may increase the performance of the electric circuit 11 by increasing power consumption by the electric circuit 11. Additionally, or alternatively, when the detected temperature of the electric circuit 11 is high, the thermal controller 16 may limit the performance of the electric circuit 11 by reducing the power consumption by the electric circuit 11. As shown in FIG. 1, the thermal controller 16 may control the voltage generator 14 and adjust the magnitude of the positive supply voltage VDD, through a first control signal CTR1. Additionally, or alternatively, the thermal controller 16 may control the clock generator 15 and adjust the frequency of the clock signal CLK, through a second control signal CTR2. Controlling a temperature and/or power consumption by adjusting the magnitude of a supply voltage and the clock frequency as described above may be referred to as dynamic voltage frequency scaling (DVFS). As described above, the thermal controller 16 may frequently detect an exact temperature of the electric circuit 11, thereby finely controlling the temperature of the electric circuit 11 in the time axis. As a result, the electric circuit 11 may provide optimum performance in a limited temperature range.

The thermal controller 16 may have any structure for performing the above-described operations. In some embodiments, the thermal controller 16 may include a processor configured to execute instructions and a memory for storing a series of instructions. In some embodiments, the thermal controller 16 may include a state machine and may include an IP core that provides fixed functionality designed by logic synthesis and/or a reconfigurable logic circuit like an FPGA. Herein, the thermal controller 16 may be referred to as a controller.

Figure 2:
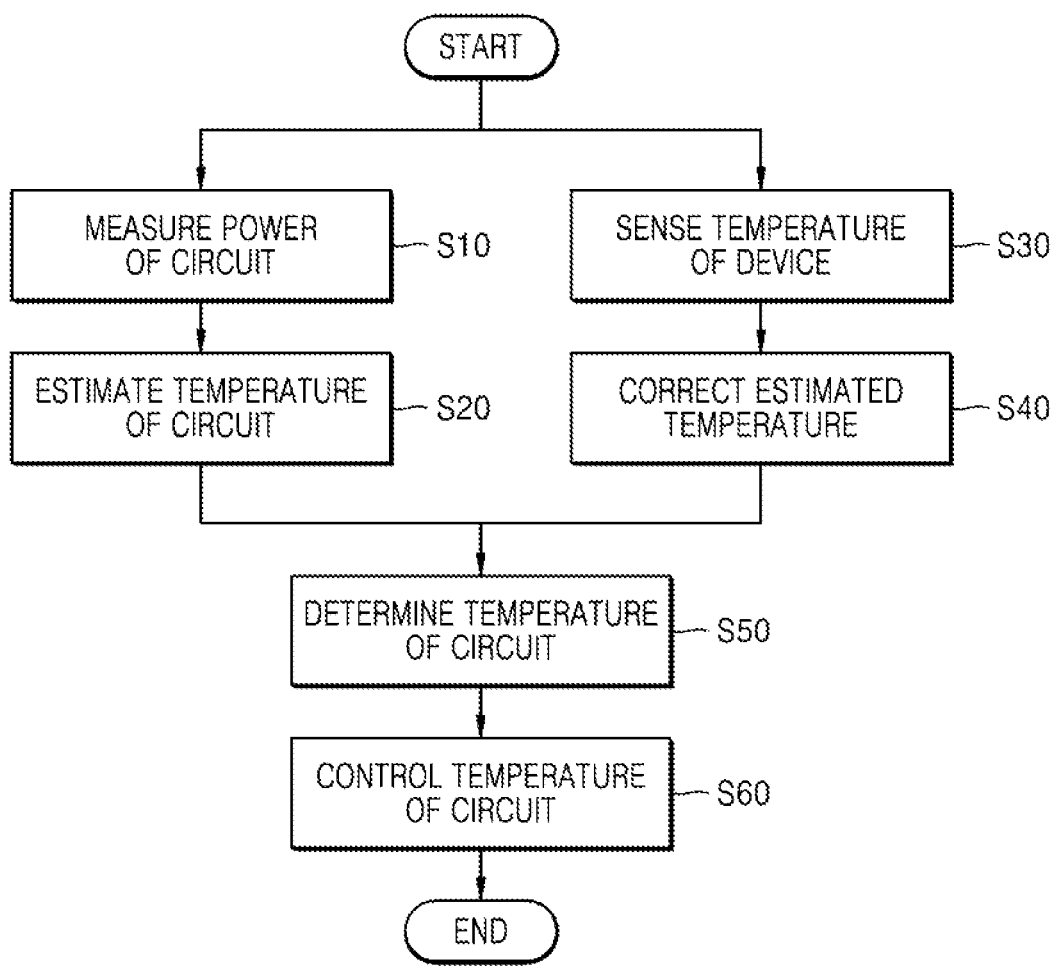
FIG. 2 is a flowchart of a method for temperature detection and thermal management according to an example embodiment.

FIG. 2 is a flowchart of a method for temperature detection and thermal management according to an example embodiment. As shown in FIG. 2, the method for temperature detection and thermal management may include a plurality of operations (operations S10 to S60), and operations S10 and S20 may be performed in parallel with operations S30 and S40. In some embodiments, the method of FIG. 2 may be performed by the device 10 of FIG. 1, and FIG. 2 will be described below with reference to FIG. 1.

Referring to FIG. 2, the power of a circuit may be measured in operation S10. For example, the power monitor 12 may measure power consumed by the electric circuit 11 based on an input signal IN provided to the electric circuit 11. The power monitor 12 may periodically measure power and provide power information PWR representing the measured power to the thermal controller 16. An example of operation S10 will be described later with reference to FIG. 11.

In operation S20, a temperature of the circuit may be estimated. For example, the temperature of the electric circuit 11 may depend on the power consumption of the electric circuit 11. Therefore, the thermal controller 16 may estimate the temperature of the electric circuit 11 based on the power information PWR provided from the power monitor 12. Herein, a temperature estimated based on the power information PWR may be referred to as a first temperature. Examples of an operation for estimating a temperature based on the power information PWR will be described later with reference to FIGS. 4, 5, and 6.

In operation S30, the temperature of a device may be sensed. For example, the temperature sensor 13 may be included in the device 10 including the electric circuit 11 and may sense the ambient temperature of the electric circuit 11. The temperature sensor 13 may periodically sense a temperature and may provide the temperature information TMP representing the measured temperature to the thermal controller 16. Herein, a temperature sensed by the temperature sensor 13 may be referred to as a second temperature.

In operation S40, the estimated temperature may be corrected. For example, the thermal controller 16 may receive the power information PWR more frequently than the temperature information TMP. Therefore, the temperature of the electric circuit 11 may be estimated every time the power information PWR is received. A temperature sensed by the temperature sensor 13 may have high reliability, and the thermal controller 16 may correct a temperature estimated based on the power information PWR based on the temperature information TMP. Therefore, an error of the temperature estimated based on the power information PWR may be eliminated. Herein, a temperature corrected based on the temperature information TMP from a temperature estimated based on the power information PWR, may be referred to as a third temperature.

In operation S50, the temperature of the circuit may be determined. For example, the thermal controller 16 may determine the temperature of the electric circuit 11 based on a temperature estimated in operation S20 (i.e., the first temperature) and a temperature corrected in operation S40 (i.e., the third temperature). In some embodiments, the thermal controller 16 may determine a temperature estimated based on the power information PWR as the temperature of the electric circuit 11 until the temperature information TMP is received, and, when the temperature information TMP is received, a temperature corrected from the estimated temperature may be determined as the temperature of the electric circuit 11. Herein, a temperature determined by the thermal controller 16 may be referred to as a detected temperature of the electric circuit 11. An example of operation S50 will be described later with reference to FIG. 7.

In operation S60, the temperature of the circuit may be controlled. For example, the thermal controller 16 may control the temperature of the electric circuit 11 based on the temperature determined in operation S50. To reduce the temperature of the electric circuit 11, the thermal controller 16 may reduce the magnitude of the positive supply voltage VDD and/or the frequency of the clock signal CLK through the first control signal CTR1 and/or the second control signal CTR2. Additionally, or alternatively, to improve the performance of the electric circuit 11, the thermal controller 16 may increase the magnitude of the positive supply voltage VDD and/or the frequency of the clock signal CLK through the first control signal CTR1 and/or the second control signal CTR2. An example of an operation in which the thermal controller 16 controls the temperature of the electric circuit 11 will be described later with reference to FIG. 9.

Figure 3:
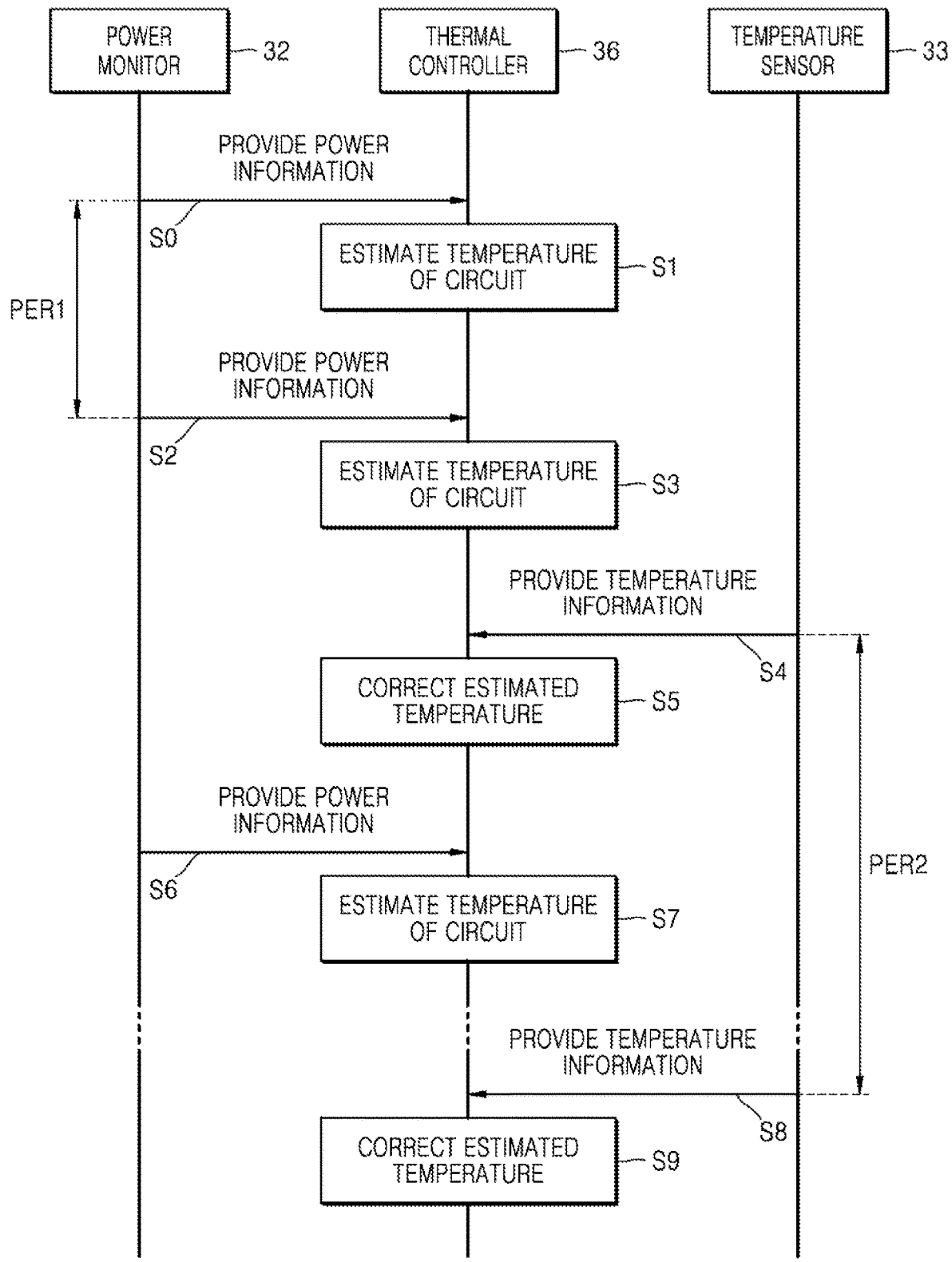
FIG. 3 is a message diagram showing a method of detecting a temperature according to an example embodiment.

FIG. 3 is a message diagram showing a method of detecting a temperature according to an example embodiment. In detail, the message diagram of FIG. 3 shows messages provided to a thermal controller 36 from a power monitor 32 and a temperature sensor 33 and operations of the thermal controller 36 over time. In the description of FIG. 3, the power monitor 32 may measure the power of the circuit (e.g., 11 of FIG. 1) and the temperature sensor 33 may sense the ambient temperature of the corresponding circuit.

In some embodiments, the power monitor 32 may provide the power information PWR to the thermal controller 36 in every first period PER1, and the temperature sensor 33 may provide the temperature information TMP to the thermal controller 36 in every second period PER2, the second period PER2 being longer than the first period PER1. In some examples, a power monitor 32 may be configured to measure a first power of the first circuit according to a first period (e.g., power monitor 32 may measure power information PWR in every first period PER1 according to the first period PER1).

As described above with reference to FIG. 1, the power monitor 32 may estimate power based on an input signal provided to the circuit, and the first period PER1 may be within the range from several ns (nanoseconds) to hundreds of ns. Additionally, or alternatively, as described above with reference to FIG. 1, the temperature sensor 33 may sense a temperature based on the characteristics of an element, and the second period PER2 may be within the range from several μs (microseconds) to hundreds of μs. Therefore, as described later, the thermal controller 36 may estimate the temperature of the circuit for each first period PER1 and correct an estimated temperature for each second period PER2. In some embodiments, the first period PER1 may vary. For example, the power monitor 32 may operate in synchronization with a clock signal (e.g., CLK of FIG. 1) provided to the circuit. Therefore, when the thermal controller 36 adjusts the frequency of the clock signal to control the temperature of the circuit, the operation speed of the power monitor 12 may fluctuate, and the first period PER1 may vary.

Referring to FIG. 3, in operation S0, the power monitor 32 may provide the power information PWR to the thermal controller 36, and, in operation S1, the thermal controller 36 may estimate the temperature of the circuit based on the power information PWR received in operation S0. After the first period PER1 is elapsed from a time point at which the power information PWR is provided in operation S0, the power monitor 32 may provide new power information PWR to the thermal controller 36 in operation S2. In operation S3, the thermal controller 36 may estimate the temperature of the circuit based on the power information PWR received in operation S2. Therefore, the thermal controller 36 may detect the temperature of the circuit in every first period PER1, the first period PER1 being shorter than the second period PER2.

In operation S4, the temperature sensor 33 may provide the temperature information TMP to the thermal controller 36, and, in operation S5, the thermal controller 36 may correct the temperature estimated in operation S3 based on the temperature information TMP. In some embodiments, as described later with reference to FIG. 4, estimation of a temperature (e.g., $T_{EST}$ of FIG. 4) based on the power information PWR may be based on a previously estimated temperature (e.g., $T_{EST}'$). Therefore, an error of an estimated temperature may propagate to subsequently estimated temperatures. The thermal controller 36 may correct a temperature estimated based on the power information PWR in every second period PER2 based on the temperature information TMP provided from the temperature sensor 33. Therefore, propagation of errors of an estimated temperature may be prevented.

In operation S6, the power monitor 32 may provide the power information PWR to the thermal controller 36, and, in operation S7, the thermal controller 36 may estimate the temperature of the circuit based on the power information PWR received in operation S6. As described above, when the temperature of the circuit is estimated based on a previously estimated temperature, in operation S7, the thermal controller 36 may estimate the temperature of the circuit based on the temperature corrected in operation S5, instead of the temperature estimated in operation S3.

After the second period PER2 is elapsed from a time point at which the temperature information TMP is provided in operation S4, the temperature sensor 33 may provide new temperature information TMP to the thermal controller 36 in operation S8. In operation S9, the thermal controller 36 may correct, based on the temperature information TMP received in operation S8, a temperature estimated before operation S8.

Accordingly, embodiments of the present disclosure include a device and methods used to control a temperature of an IC. The device includes a first circuit, a power monitor 32, a temperature sensor 33, and a controller 36. The first circuit is configured to operate based on first input signals. The power monitor 32 is configured to measure first power of the first circuit based on the first input signals in every first period (e.g., at S1, S3, etc.). The temperature sensor 33 is configured to sense a temperature of the device in every second period (e.g., at S4, S8, etc.). The controller 36 is configured to estimate a first temperature of the first circuit in every first period, receive a second temperature from the temperature sensor in every second period, calculate a third temperature by correcting the first temperature based on the second temperature, and determine the temperature of the first circuit based on the first temperature and the third temperature in every first period. The first period may be shorter than the second period. For example, the controller 36 may calculate a third temperature (e.g., at S5) by correcting the first temperature (e.g., from S3) based on the second temperature (e.g., from S4).

Figures 4, 5:
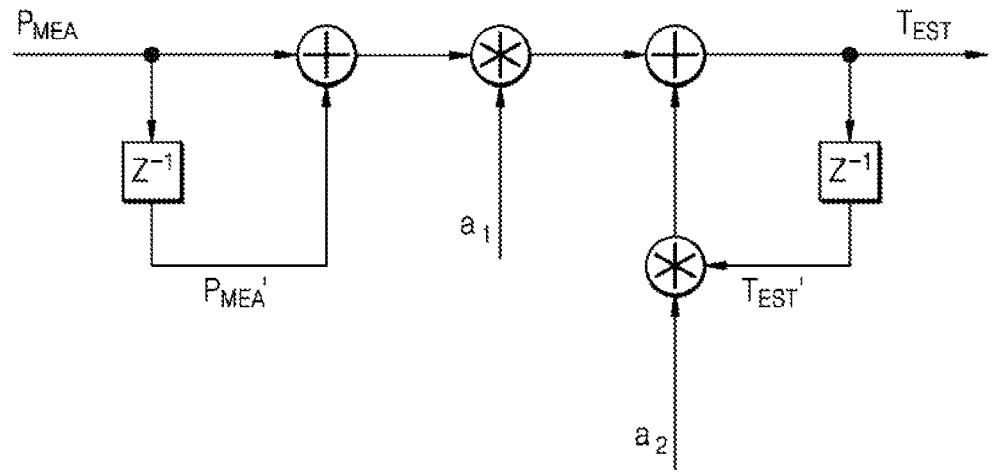
FIG. 4 is a diagram showing a method of detecting a temperature according to an example embodiment.
FIG. 5 is a diagram showing a look-up table according to an example embodiment.

FIG. 4 is a diagram showing a method of detecting a temperature according to an example embodiment. In detail, FIG. 4 schematically shows an operation of estimating a temperature $T_{EST}$ based on measured power $P_{MEA}$ of the electric circuit 11, identified by the thermal controller 16 of FIG. 1 from the power information PWR, by using operators. In FIG. 4, an operator $Z^{-1}$ may correspond to a unit delay and may provide a value input in a previous estimation operation. In some embodiments, the thermal controller 16 may include hardware components corresponding to operators shown in FIG. 4, e.g., adders, multipliers, and buffers. Additionally, or alternatively, in some embodiments, the thermal controller 16 may sequentially perform operations corresponding to the operators shown in FIG. 4 by executing a series of instructions.

In some embodiments, the thermal controller 16 may estimate a temperature based on a skin temperature calculation. For example, the thermal controller 16 may calculate the temperature $T_{EST}$ from the measured power $P_{MEA}$ based on Equation 1 below.

$$T_{EST}(n) = a_1 * (P_{MEA}(n) + P_{MEA}(n-1)) + a_2 * T_{EST}(n-1) \quad (1)$$

In Equation 1, n is a positive integer and may be a variable that increases according to the number of estimations (or the number of times of reception of the power information PWR). In Equation 1, $P_{MEA}(n)$ is a currently measured power (for example, a value included in currently received power information PWR) and may correspond to $P_{MEA}$ of FIG. 4. $P_{MEA}(n-1)$ is previously measured power (for example, a value included in previously received power information PWR) and may correspond to $P_{MEA}'$ of FIG. 4. Additionally, or alternatively, in Equation 1, $T_{EST}(n)$ is a currently estimated temperature and may correspond to $T_{EST}$ of FIG. 4. $T_{EST}(n-1)$ is a previously estimated temperature and may correspond to $T_{EST}'$ of FIG. 4. In Equation 1, $a_1$ and $a_2$ are coefficients, and the thermal controller 16 may obtain a1 and a2 in various ways. Examples in which the thermal controller 16 obtains $a_1$ and $a_2$ will be described later with reference to FIGS. 5 and 6.

As shown in FIG. 4, the currently estimated temperature $T_{EST}$ may be calculated based on the previously estimated temperature $T_{EST}'$. Therefore, when the estimated temperature $T_{EST}$ has an error, the error may propagate to subsequently estimated temperatures. However, as described above with reference to FIG. 3, the thermal controller 16 may correct $T_{EST}$ periodically (for example, in every second period PER2) based on the highly reliable temperature information TMP provided from the temperature sensor 13, thereby preventing propagation of errors.

FIG. 5 is a diagram showing a look-up table 50 according to an example embodiment. In detail, FIG. 5 shows the look-up table 50 providing the coefficients of FIG. 4. For example, $a_1$ and $a_2$. Hereinafter, FIG. 5 will be described with reference to FIG. 1.

In some embodiments, the device 10 of FIG. 1 may include the look-up table 50 of FIG. 5. For example, the device 10 may include a non-volatile memory that does not lose data even when power supply is cut off (e.g., flash memory, one-time programmable (OTP) memory, etc.), and the look-up table 50 may be stored in the non-volatile memory. The thermal controller 16 may obtain $a_1$ and $a_2$ of FIG. 4 from the look-up table 50 by accessing the non-volatile memory. In some embodiments, values of $a_1$ and $a_2$ included in the look-up table 50 may be determined by testing the device 10 and may be externally applied during a manufacturing process of the device 10.

In some embodiments, the look-up table 50 may include values of $a_1$ and $a_2$ corresponding to a plurality of combinations of operation parameters of the electric circuit 11. For example, the look-up table 50 may include values of $a_1$ and $a_2$ corresponding to a plurality of combinations of the positive supply voltage VDD and the clock signal CLK. As shown in FIG. 5, the look-up table 50 may include X11 and Y11 as values of $a_1$ and $a_2$ corresponding to the positive supply voltage VDD, which may be a first voltage V1, and the clock signal CLK with a first frequency f1. Additionally, or alternatively, the look-up table 50 may include X12 and Y12 as values of $a_1$ and $a_2$ corresponding to the positive supply voltage VDD, which may be the first voltage V1, and the clock signal CLK with a second frequency f2. Similarly, the look-up table 50 may include X21 and Y21 corresponding to a second voltage V2 and the first frequency f1 and may include X22 and Y22 corresponding to the second voltage V2 and a second frequency f2.

The thermal controller 16 may identify operation parameters of the electric circuit 11 and may obtain coefficients corresponding to identified operation parameters from the look-up table 50. For example, the thermal controller 16, which controls the voltage generator 14 through the first control signal CTR1 and controls the clock generator 15 through the second control signal CTR2, may identify the magnitude of the positive supply voltage VDD and the frequency of the control signal CLK provided to the electric circuit 11. The thermal controller 16 may obtain values of $a_1$ and $a_2$ corresponding to the current magnitude of the positive supply voltage VDD and the frequency of the clock signal CLK from the look-up table 50 and estimate the temperature of the electric circuit 11 from the power information PWR based on the obtained values and Equation 1.

Figure 6:
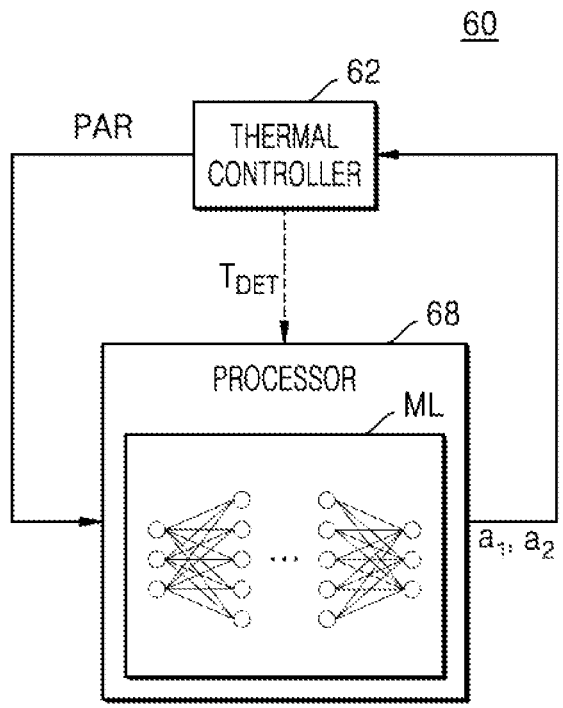
FIG. 6 is a block diagram showing a device according to an example embodiment.

FIG. 6 is a block diagram showing a device 60 according to an example embodiment. In detail, FIG. 6 is a block diagram showing the device 60 including a thermal controller 62 that obtains coefficients $a_1$ and $a_2$ of FIG. 4 based on a machine learning model ML. As shown in FIG. 6, the device 60 may include the thermal controller 62 and a processor 68.

The thermal controller 62 may provide operation parameters PAR representing a state of the electric circuit 11 to the processor 68 and receive the coefficients of FIG. 4 (for example, $a_1$ and $a_2$) from the processor 68. The operation parameters PAR may include, as non-limiting examples, the magnitude of the positive supply voltage VDD, the frequency of the clock signal CLK, current measured power of the electric circuit 11, and/or a detected temperature.

The processor 68 may execute the machine learning model ML. The processor 68 may be dedicated hardware designed to execute the machine learning model ML like an NPU or may be a multi-purpose hardware executing the machine learning model ML like a CPU and a GPU. In some embodiments, the processor 68 may include a memory for storing data to execute the machine learning model ML or may access a memory outside the processor 68.

The machine learning model ML may be in a state trained by using a plurality of samples of operation parameters of the electric circuit 11. Therefore, the processor 68 may generate $a_1$ and $a_2$ from an output provided by the machine learning model ML in response to the operation parameters PAR provided from the thermal controller 62 and provide $a_1$ and $a_2$ to the thermal controller 62. The machine learning model ML may be an arbitrary model trained by using a plurality of samples of operation parameters. For example, the machine learning model ML may be a model based on an artificial neural network, a decision tree, a support vector machine, a regression analysis, a Bayesian network, a genetic algorithm, etc. In some embodiments, when the machine learning model ML is based on an artificial neural network, the artificial neural network may include, as non-limiting examples, a convolution neural network (CNN), a region with convolution neural network (R-CNN), a region proposal network (RPN) a recurrent neural network (RNN), a stacking-based deep neural network (S-DNN), a state-space dynamic neural network (S-SDNN), a deconvolution network, a deep belief network (DBN), a restricted Boltzmann machine (RBM), a fully convolutional network, a long short-term memory (LSTM) network, and a classification network.

In some embodiments, the processor 68 may train the machine learning model ML. For example, as shown in FIG. 6, the thermal controller 62 may provide a finally determined temperature of the electric circuit 11 (for example, a detected temperature $T_{DET}$) to the processor 68. The processor 68 may obtain a temperature estimated based on the operation parameters PAR and $a_1$ and $a_2$ provided to the thermal controller 62 and may train the machine learning model ML based on a difference between the obtained temperature and the detected temperature $T_{DET}$ provided by the thermal controller 62. In some embodiments, when a temperature sensor (e.g., 13 in FIG. 1) is provided inside a circuit (e.g., 11 in FIG. 1), the thermal controller 62 may provide a temperature sensed by the temperature sensor to the processor 68, and the processor 68 may also train the machine learning model ML based on the temperature provided from the thermal controller 62.

Figure 7:
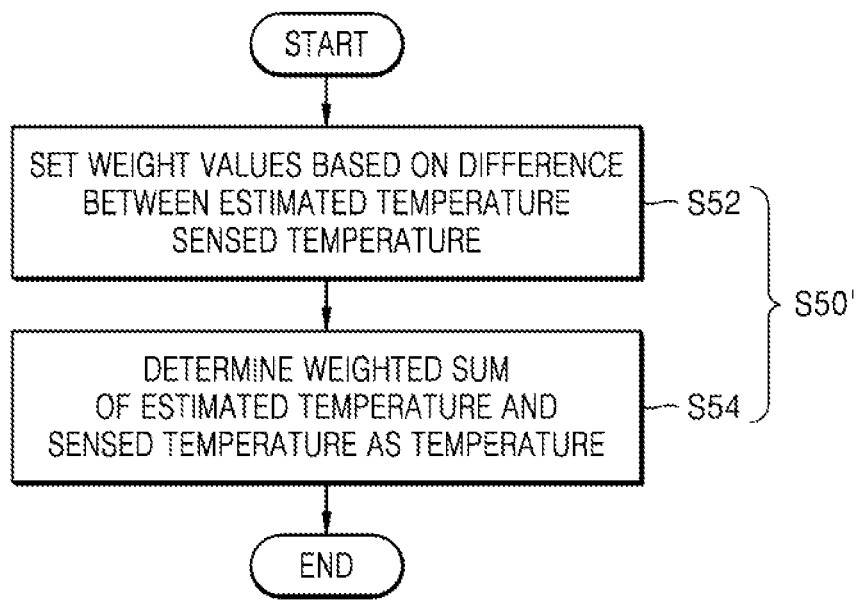
FIG. 7 is a flowchart of a method of detecting a temperature according to an example embodiment.

FIG. 7 is a flowchart of a method of detecting a temperature according to an example embodiment. In detail, the flowchart of FIG. 7 shows an example of operation S50 of FIG. 2. As described above with reference to FIG. 2, a temperature of a circuit may be determined in operation S50' of FIG. 7. As shown in FIG. 7, operation S50' may include operation S52 and operation S54. In some embodiments, operation S50' may be performed by the thermal controller 16 of FIG. 1, and FIG. 7 will be described below with reference to FIG. 1.

Referring to FIG. 7, weights may be set based on a difference between an estimated temperature (i.e., a first temperature) and a sensed temperature (i.e., a second temperature) in operation S52, and, in operation S54, a detected temperature may be determined as a weighted sum of the estimated temperature and the sensed temperature. For example, the thermal controller 16 may determine the detected temperature $T_{DET}$ of the electric circuit 11 based on Equation 2 below.

$$T_{DET} = w_1 * T_{EST} + w_2 * T_{SEN} \tag{1}$$

In Equation 2, $T_{EST}$ may be a temperature estimated based on the power information PWR, and $T_{SEN}$ may be a temperature corresponding to the temperature information TMP provided from the temperature sensor 13.

The thermal controller 16 may determine a first weight $w_1$ and a second weight $w_2$ of Equation 2 based on a difference between the estimated temperature $T_{EST}$ and the sensed temperature $T_{SEN}$. For example, the thermal controller 16 may set the second weight $w_2$ that increases as the difference between the estimated temperature $T_{EST}$ and the sensed temperature $T_{SEN}$ increases and may set the first weight $w_1$ that decreases as the difference between the estimated temperature $T_{EST}$ and the sensed temperature $T_{SEN}$ increases. Accordingly, an error of the estimated temperature $T_{EST}$ may be eliminated early.

In some embodiments, unlike as shown in FIG. 7, operation S52 may be omitted. For example, the thermal controller 16 may determine a temperature as a weighted sum of an estimated temperature and a sensed temperature based on pre-defined weights. For example, when the temperature sensor 13 is provided apart from the electric circuit 11, a temperature sensed by the temperature sensor 13 (for example, the sensed temperature $T_{SEN}$) may be different from an temperature of the electric circuit 11. Therefore, the first weight $w_1$ and the second weight $w_2$ may be calculated in advance based on the characteristics of a medium (e.g., thermal conductivity) between the electric circuit 11 and the temperature sensor 13 or may be determined in advance through a test, and the thermal controller 16 may determine the detected temperature $T_{DET}$ based on the first weight $w_1$ and the second weight $w_2$ determined in advance. Additionally, or alternatively, in some embodiments, when the temperature information TMP is received from the temperature sensor 13, the thermal controller 16 may determine whether the detected temperature $T_{DET}$ is equal to the sensed temperature $T_{SEN}$ indicated by the temperature information TMP. In other words, the thermal controller 16 may set the first weight $w_1$ to zero and the second weight $w_2$ to one in Equation 2.

Figures 8, 9:
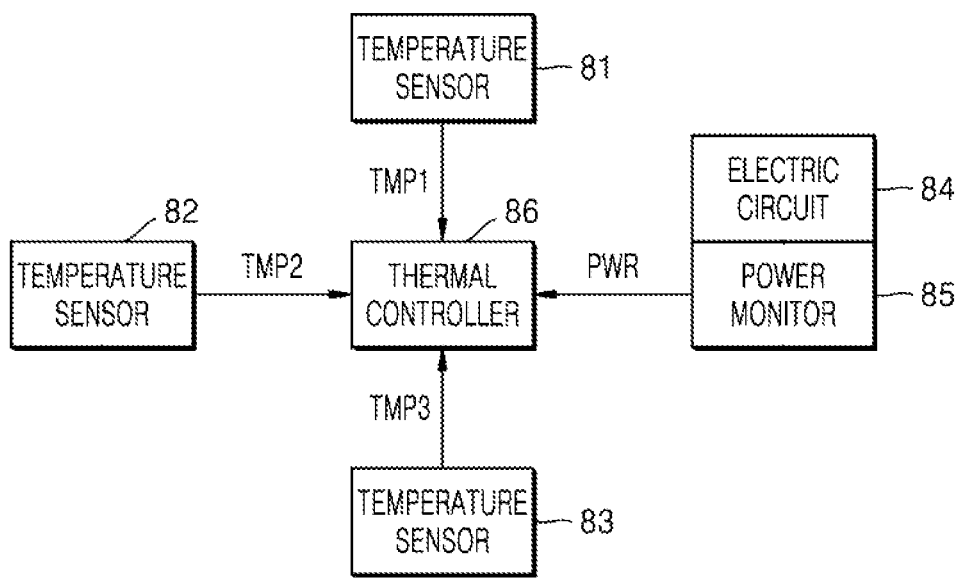
FIG. 8 is a block diagram showing a device according to an example embodiment.
FIG. 9 is a diagram showing a method for thermal management according to an example embodiment.

FIG. 8 is a block diagram showing a device 80 according to an example embodiment. In detail, the block diagram of FIG. 8 shows the device 80 including a plurality of temperature sensors. Hereinafter, descriptions identical to those given above with reference to FIG. 1 will be omitted.

Referring to FIG. 8, the device 80 may include a first temperature sensor 81, a second temperature sensor 82, a third temperature sensor 83, an electric circuit 84, a power monitor 85, and a thermal controller 86. In some embodiments, the device 80 may further include a voltage generator and/or a clock generator controlled by the thermal controller 86. Additionally, or alternatively, in some embodiments, unlike as shown in FIG. 8, the device 80 may include two or more temperature sensors. The thermal controller 86 may receive first temperature information TMP1 from the first temperature sensor 81, receive second temperature information TMP2 from the second temperature sensor 82, and receive third temperature information TMP3 from the third temperature sensor 83. Additionally, or alternatively, the thermal controller 86 may receive the power information PWR, which may be generated by the power monitor 85 by measuring the power of the electric circuit 84, from the power monitor 85.

The device 80 includes a plurality of temperature sensors (for example, the first temperature sensor 81, the second temperature sensor 82, and the third temperature sensor 83) to sense temperatures due to a plurality of other heat-emitting components as well as a temperature due to the electric circuit 84. Temperatures sensed by the first temperature sensor 81, the second temperature sensor 82, and the third temperature sensor 83 may depend on heat emitted by the electric circuit 84. Therefore, the thermal controller 86 may correct a temperature, which may be estimated based on the power information PWR, based on the temperatures sensed by the first temperature sensor 81, the second temperature sensor 82, and the third temperature sensor 83. In some embodiments, the thermal controller 86 may correct a temperature, which may be estimated based on the power information PWR, based on each of the first temperature information TMP1, the second temperature information TMP2, and the third temperature information TMP3 and calculate an average of corrected temperatures, thereby detecting the temperature of the electric circuit 84. In some embodiments, as described above with reference to Equation 2, the thermal controller 86 may detect the temperature of the electric circuit 84 as a weighted sum of temperatures, respectively indicated by the first temperature information TMP1, the second temperature information TMP2 and the third temperature information TMP3, and a temperature estimated based on the power information PWR.

FIG. 9 is a diagram showing a method for thermal management according to an example embodiment. In detail, FIG. 9 shows pseudo-code corresponding to a method of controlling a temperature of a circuit based on a detected temperature $T_{DET}$ and measured power $P_{MEA}$. In some embodiments, the method of FIG. 9 may be performed by the thermal controller 16 of FIG. 1, and FIG. 9 will be described below with reference to FIG. 1.

In some embodiments, the thermal controller 16 may perform DVFS when the temperature of the electric circuit 11 exceeds a certain temperature. For example, as shown in line 11 of FIG. 9, the detected temperature $T_{DET}$ may be compared with a first threshold value $THR_1$. When the detected temperature $T_{DET}$ of the electric circuit 11 is less than or equal to the first threshold value $THR_1$, the thermal controller 16 may not limit the performance of the electric circuit 11. Therefore, the electric circuit 11 may operate based on the maximum performance. Additionally, or alternatively, when the detected temperature $T_{DET}$ of the electric circuit 11 exceeds the first threshold value $THR_1$, the thermal controller 16 may adjust power consumed by the electric circuit 11 as described below, thereby controlling the temperature of the electric circuit 11. In some embodiments, the first threshold value $THR_1$ may be lower than a temperature limit or a critical temperature (e.g., $T_C$ of FIGS. 10A and 10B) of the electric circuit 11.

In some embodiments, the thermal controller 16 may predict an increase in temperature when the power consumption of the electric circuit 11 is high and predict a decrease in temperature when the power consumption of the electric circuit 11 is low. Therefore, the thermal controller 16 may adjust the power consumption of the electric circuit 11 based on the measured power $P_{MEA}$ of the electric circuit 11. For example, as shown in line 12 of FIG. 9, the measured power $P_{MEA}$ may be compared with a second threshold value $THR_2$. When the measured power $P_{MEA}$ of the electric circuit 11 exceeds the second threshold value $THR_2$, the thermal controller 16 may reduce the power consumption of the electric circuit 11, as shown in line 13 of FIG. 9. For example, power exceeding the second threshold value $THR_2$ may increase the temperature of the electric circuit 11. Therefore, the thermal controller 16 may reduce the power consumption of the electric circuit 11. As a result, the performance of electric circuit 11 may be limited. Additionally, or alternatively, when the measured power $P_{MEA}$ of the electric circuit 11 is less than or equal to the second threshold value $THR_2$, the thermal controller 16 may increase the power consumption of the electric circuit 11, as shown in line 15 of FIG. 9. For example, power less than or equal to the second threshold value $THR_2$ may be insufficient to increase the temperature of the electric circuit 11, and thus, the thermal controller 16 may increase the power consumption of the electric circuit 11. As a result, the performance of electric circuit 11 may be improved. In some embodiments, as described below, the second threshold value $THR_2$ may dynamically vary.

As described above with reference to FIG. 1, the thermal controller 16 may adjust the magnitude of the positive supply voltage VDD and/or the frequency of the clock signal CLK through the first control signal CTR1 and/or the second control signal CTR2, and thus, the power consumption of the electric circuit 11 may be adjusted. Increasing of the power consumption of the electric circuit 11 through the first control signal CTR1 and/or the second control signal CTR2 by the thermal controller 16 may be referred to as DVFS up-scaling, whereas reduction of the power consumption of the electric circuit 11 through the first control signal CTR1 and/or the second control signal CTR2 by the thermal controller 16 may be referred to as DVFS down-scaling.

In some embodiments, the thermal controller 16 may adjust the second threshold value $THR_2$ based on an amount of change (or a rate of change or a slope) of the detected temperature $T_{DET}$. When the detected temperature $T_{DET}$ rises rapidly, the thermal controller 16 may decrease the second threshold value $THR_2$ to actively reduce the power consumption of the electric circuit 11. For example, as shown in line 18 of FIG. 9, a difference between a current detected temperature $T_{DET}$ and a previous detected temperature $T_{DET}'$ may be compared with a third threshold value $THR_3$. When the difference between the current detected temperature $T_{DET}$ and the previous detected temperature $T_{DET}'$ exceeds the third threshold value $THR_3$, as shown in line 19 of FIG. 9, the second threshold value $THR_2$ may be decreased by u (u is a positive real number). When the difference between the current detected temperature $T_{DET}$ and the previous detected temperature $T_{DET}'$ is less than or equal to the third threshold value $THR_3$, as shown in line 21 of FIG. 9, the second threshold value $THR_2$ may be increased by u.

Figure 10A:
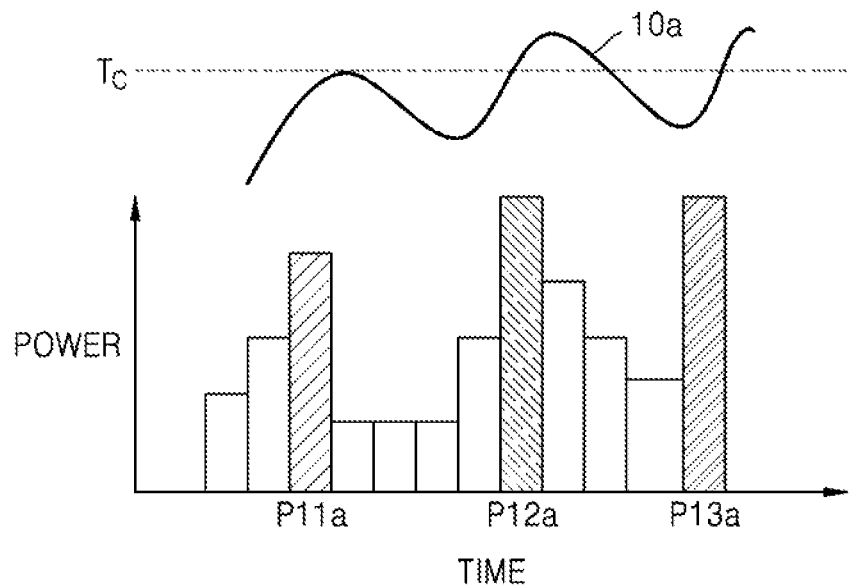
FIGS. 10A and 10B are graphs showing changes in power and temperature of a circuit over time.
Figure 10B:
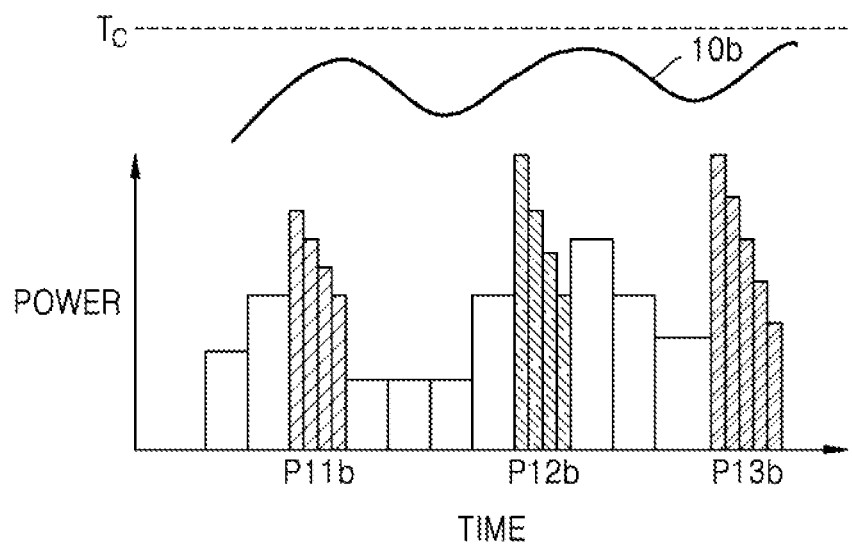

FIGS. 10A and 10B are graphs showing changes in power and temperature of a circuit over time. In detail, the graph of FIG. 10A shows changes in power and temperature of a circuit according to a comparative example, and FIG. 10B shows changes in power and temperature of a circuit according to an example embodiment. Hereinafter, descriptions of FIGS. 10A and 10B are identical to each other and will be omitted.

Referring to FIG. 10A, as power consumption of a circuit increases, a temperature 10a of the circuit may increase, and, as the power consumption of the circuit decreases, the temperature 10a of the circuit may decrease. When the first power of the circuit is adjusted every relatively long period, the temperature of the circuit may rise beyond the critical temperature $T_C$ or the performance of the circuit may be excessively limited. For example, as shown in FIG. 10A, when the power of the circuit is adjusted at a certain period (e.g., an operation period of a temperature sensor), high power consumption may be maintained during periods like a first period P11a, a second period P12a, and a third period P13a. Therefore, the temperature 10a of the circuit may rise beyond the critical temperature $T_C$, thereby causing a malfunction and/or a failure of the circuit and/or a device including the circuit and damage to a user of the device.

Referring to FIG. 10B, according to an example embodiment, power consumption of a circuit may be more finely adjusted in the time axis, and a temperature 10b of the circuit may be maintained below the critical temperature $T_C$. As shown in FIG. 10B, when high power of the circuit is measured at the beginning of each of a first period P11b, a second period P12b, and a third period P13b, the first period P11b, the second period P12b, and the third period P13b may be extended, but the power consumption of the circuit may be reduced early. Therefore, the rise of the temperature 10b of the circuit may be limited, and the temperature 10b of the circuit may be maintained below the critical temperature $T_C$.

Figure 11:
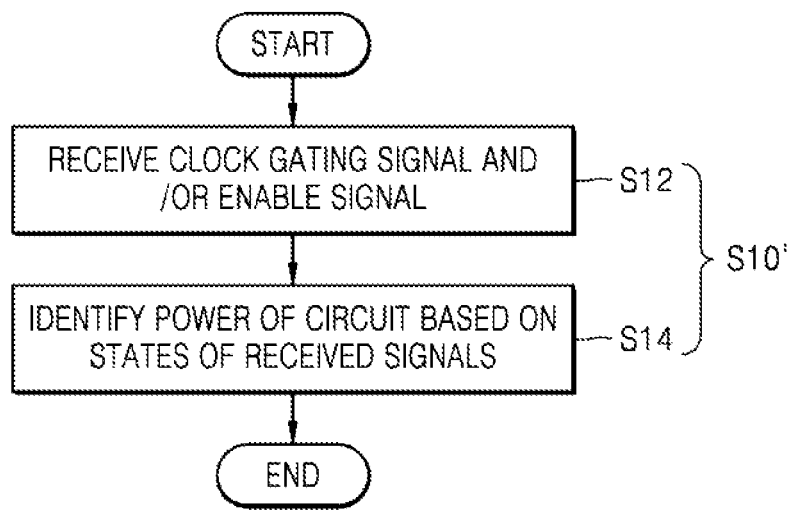
FIG. 11 is a flowchart of a method of detecting a temperature according to an example embodiment.

FIG. 11 is a flowchart of a method of detecting a temperature according to an example embodiment. In detail, the flowchart of FIG. 11 shows an example of operation S10 of FIG. 2. As described above with reference to FIG. 2, the power of the circuit may be measured in operation S10' of FIG. 11. As shown in FIG. 11, operation S10' may include operation S12 and operation S14. In some embodiments, operation S10' may be performed by the power monitor 12 of FIG. 1, and FIG. 11 will be described below with reference to FIG. 1.

Referring to FIG. 11, a clock gating signal and/or an enable signal may be received in operation S12. When the clock gating signal is activated, cycles of the clock signal CLK provided to the electric circuit 11 may be blocked, and thus, the operation of the electric circuit 11 may be suspended. Additionally, or alternatively, when the enable signal is deactivated, the electric circuit 11 may be disabled, and power consumption by the electric circuit 11 may be reduced or eliminated. Therefore, the clock gating signal and/or enable signal may be used to measure the power of the electric circuit 11, and the power monitor 12 may receive the clock gating signal and/or the enable signal provided to the electric circuit 11.

In operation S14, the power of the circuit may be identified based on a state of a received signal. For example, as disclosed in U.S. patent application Ser. No. 15/931,043, the power monitor 12 may reference a plurality of power ranges corresponding to states of a clock gating signal and/or an enable signal. The power monitor 12 may store the states of the clock gating signal and/or the enable signal, received in operation S12, and identify a power range corresponding to stored states from among a plurality of power ranges as the power of the electric circuit 11. The power monitor 12 may generate the power information PWR representing the identified power and may provide the power information PWR to the thermal controller 16.

As described above with reference to FIG. 3, operation S10' may be performed periodically. For example, the power monitor 12 may identify the power of the electric circuit 11 based on a clock gating signal and/or an enable signal received during the first period PER1 and generate the power information PWR in every first period PER1. The first period PER1 may be shorter than a period in which the temperature sensor 13 senses a temperature (for example, the second period PER2). Therefore, the thermal controller 16 may detect the temperature of the electric circuit 11 more frequently.

Figure 12:
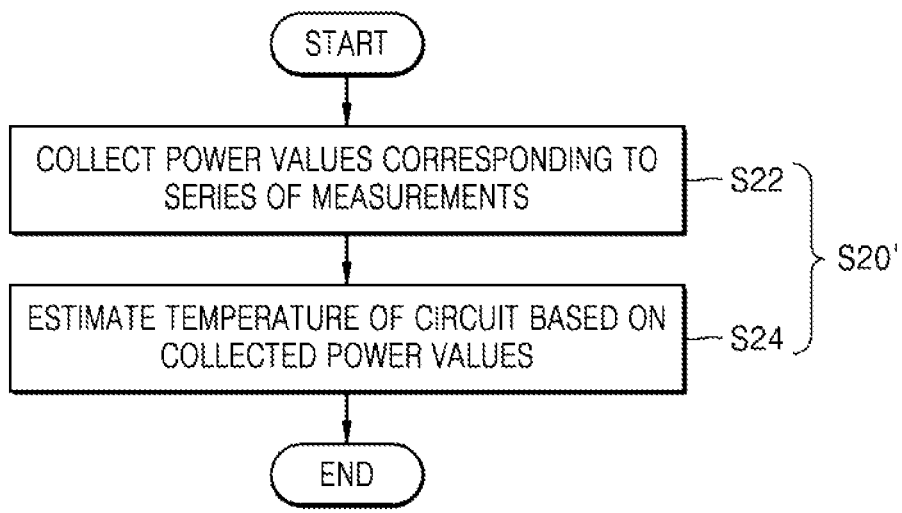
FIG. 12 is a flowchart of a method of detecting a temperature according to an example embodiment.

FIG. 12 is a flowchart of a method of detecting a temperature according to an example embodiment. In detail, FIG. 12 is a flowchart showing an example of operation S20 of FIG. 2. As described above with reference to FIG. 2, a temperature of a circuit may be estimated in operation S20' of FIG. 12. As shown in FIG. 12, operation S20' may include operation S22 and operation S24. In some embodiments, operation S20' may be performed by the power monitor 12 of FIG. 1, and FIG. 12 will be described below with reference to FIG. 1.

Referring to FIG. 12, power values corresponding to a series of measurements may be collected in operation S22. For example, the thermal controller 16 may collect power values corresponding to the power information PWR received every first period PER1. In some embodiments, the power monitor 12 may be used by the thermal controller 16 as well as other components of the device 10, and thus the first period PER1 may be shorter than a period used for the thermal controller 16 to control the temperature of the electric circuit 11. Therefore, the thermal controller 16 may collect power values corresponding to a series of measurements during a period corresponding to a plurality of first periods PER1, and the period for collecting power values may still be shorter than the second period PER2.

In operation S24, the temperature of the circuit may be estimated based on the collected power values. For example, the thermal controller 16 may calculate an average value of the power values collected in operation S22 and determine the measured power of the electric circuit 11 as the average value. The thermal controller 16 may estimate a temperature based on the determined power, as described above with reference to FIG. 4.

Figure 13:
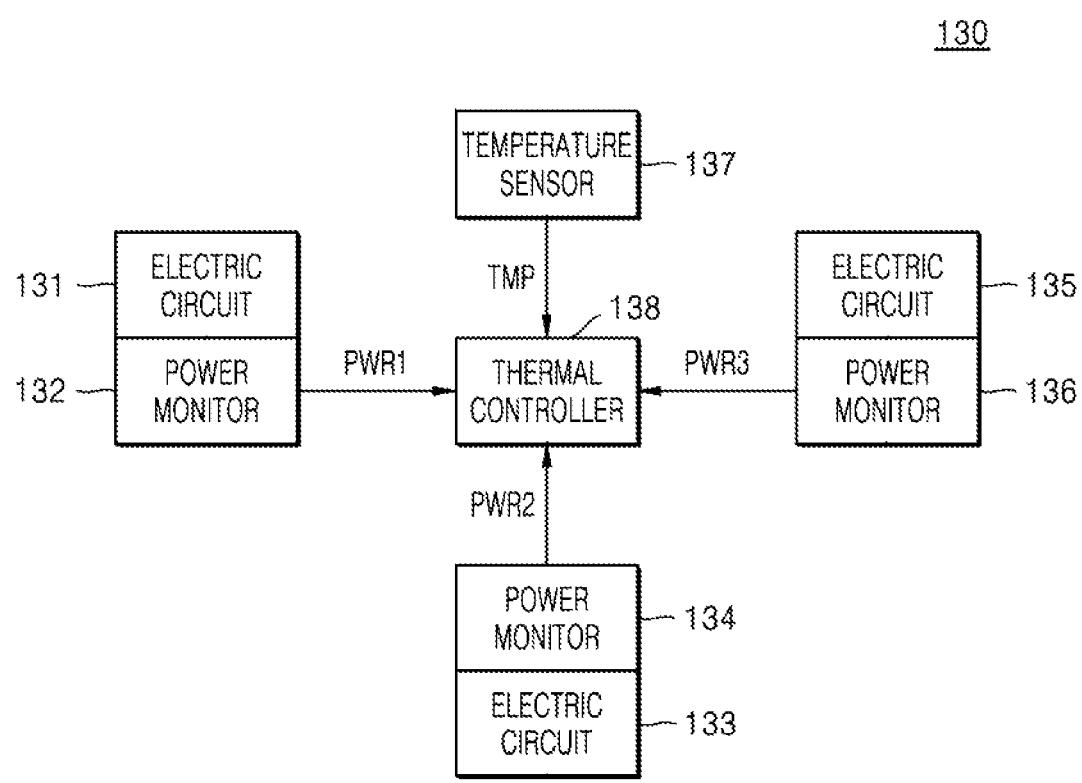
FIG. 13 is a block diagram showing a device according to an example embodiment.

FIG. 13 is a block diagram showing a device 130 according to an example embodiment. In detail, the block diagram of FIG. 13 shows the device 130 including a plurality of power monitors. Hereinafter, descriptions identical to those given above with reference to FIG. 1 will be omitted.

Referring to FIG. 13, the device 130 may include a first electric circuit 131, a first power monitor 132, a second electric circuit 133, a second power monitor 134, a third electric circuit 135, a third power monitor 136, a temperature sensor 137, and a thermal controller 138. In some embodiments, the device 130 may further include a voltage generator and/or a clock generator controlled by the thermal controller 138. Additionally, or alternatively, in some embodiments, unlike as shown in FIG. 13, the device 80 may include two or more power monitors. The thermal controller 138 may receive first power information PWR1 from the first power monitor 132, second power information PWR2 from the second power monitor 134, and third power information PWR3 from the third power monitor 136. Additionally, or alternatively, the thermal controller 138 may receive the temperature information TMP from the temperature sensor 137.

The device 130 may include a plurality of circuits each designed to perform various functions. For example, the first electric circuit 131, the second electric circuit 133, and the third electric circuit 135 may be included in device 130. For example, the device 130 may be a system-on-chip like an application processor (AP), and the thermal controller 138 may be included in the system-on-chip. The first electric circuit 131, the second electric circuit 133, and the third electric circuit 135 may each correspond to one of the components of a system-on-chip communicating with one another through a bus, e.g., a processor, a hardware accelerator, a memory device, a memory controller, an input/output interface device, a display driver device, a network interface device, etc., or may correspond to circuit blocks included in the above-described components.

The first power monitor 132, the second power monitor 134, and the third power monitor 136 may measure power consumptions of the first electric circuit 131, the second electric circuit 133, and the third electric circuit 135, respectively. The thermal controller 138 may estimate local temperatures of the device 130 based on the first power information PWR1, the second power information PWR2, and the third power information PWR3, and the estimated local temperatures may be corrected based on the temperature information TMP. Therefore, even when a plurality of temperature sensors are not dispersed throughout the device 130, the thermal controller 138 may detect temperatures of local regions. For example, regions in which the first electric circuit 131, the second electric circuit 133, and the third electric circuit 135 are arranged.

Figure 14:
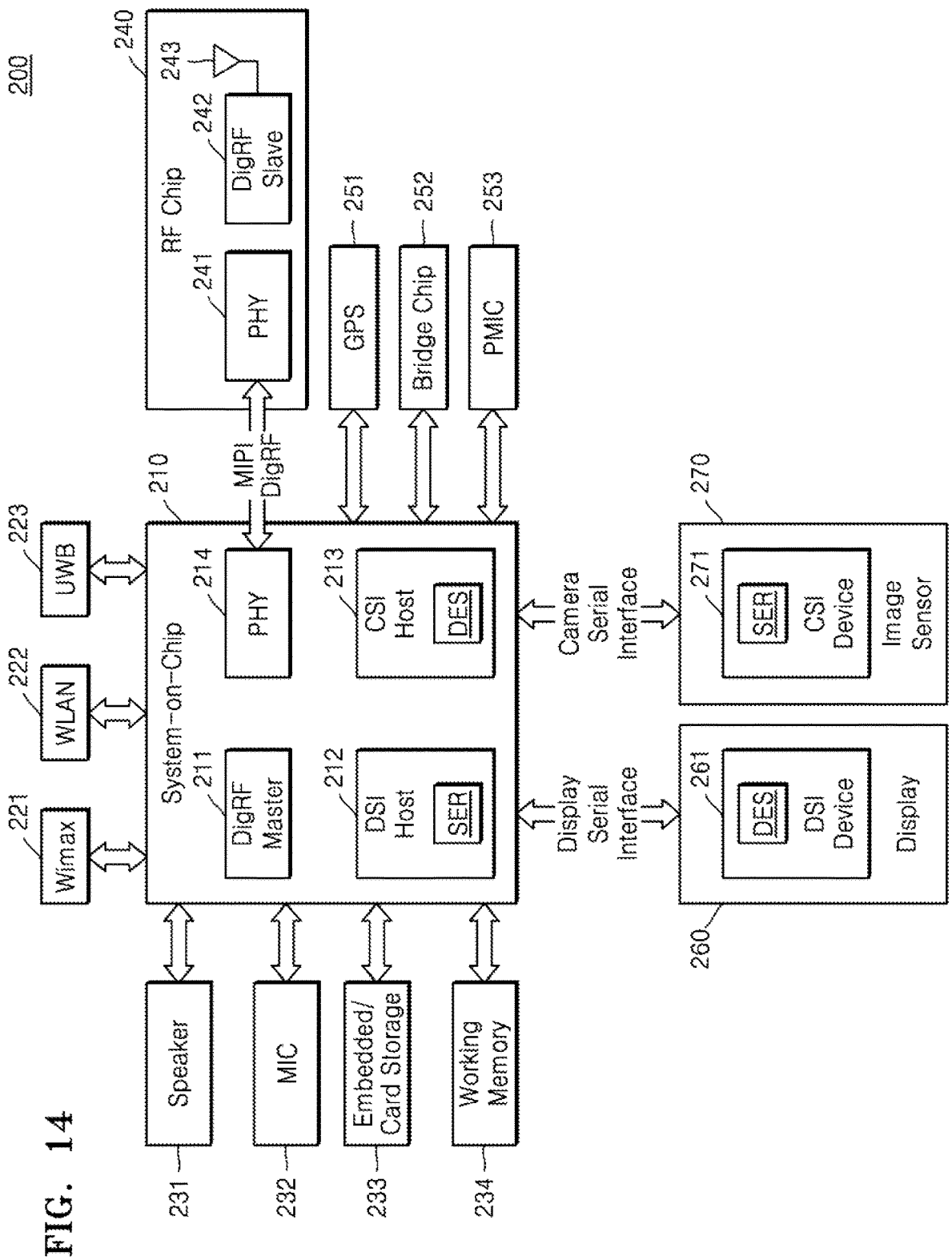
FIG. 14 is a block diagram showing a system according to an example embodiment.

FIG. 14 is a block diagram showing a system 200 according to an example embodiment. As non-limiting examples, the system 200 may include a desktop computer, a workstation, a server, a laptop computer, a tablet computer, a mobile phone, and a wearable device, or may include a data processing device, a home appliance, a dashboard camera, or a drone that uses or supports an interface protocol used by the Mobile Industry Processor Interface Alliance (MIPI).

Referring to FIG. 14, the system 200 may include a system-on-chip 210, a display 260, and an image sensor 270. In some embodiments, the system-on-chip 210 may include devices described above with reference to the drawings. As shown in FIG. 14, the system-on-chip 210 includes a DigRF master 211, a display serial interface (DSI) host 212, a camera serial interface (CSI) host 213, and a physical layer 214. The DSI host 212 may communicate with a DSI device 261 of the display 260 according to a DSI. A serializer SER may be included in the DSI host 212, and a deserializer DES may be included in the DSI device 261. The CSI host 213 may communicate with a CSI device 271 of the image sensor 270 according to a CSI. The CSI host 213 may include a deserializer DES, and the CSI device 271 may include a serializer SER.

The system 200 may further include a radio frequency (RF) chip 240 that communicates with the system-on-chip 210. The RF chip 240 may include a physical layer 241, a DigRF slave 242, and an antenna 243. For example, the physical layer 241 of the RF chip 240 and the physical layer 214 of the system-on-chip 210 may transmit and receive data to and from each other through a DigRF interface used by the MIPI Alliance.

The system 200 may communicate with an external device and/or an external system through a communication module like a world interoperability for microwave access (Wimax) module 221, a wireless local area network (WLAN) module 222, an ultra wideband (UWB) module 223, etc. The system 200 may further include a working memory 234 and embedded/card storage devices 233. The working memory 234 and the embedded/card storage devices 233 may store data related to the system-on-chip 210. An embedded storage device may be embedded in the system 200, and a card storage device may be detachably connected to the system 200. Additionally, or alternatively, the system 200 may further include a speaker 231, a microphone 232, a global positioning system (GPS) device 251, a bridge chip 252, and a power management integrated circuit (PMIC) 253. In some embodiments, the PMIC 253 may provide a supply voltage to the system-on-chip 210 and may be controlled by a thermal controller included in the system-on-chip 210.

While the inventive concept has been particularly shown and described with reference to embodiments thereof, it will be understood that various changes in form and details may be made therein without departing from the spirit and scope of the following claims.

What is claimed is:
1. A device comprising:
   a first circuit configured to operate based on first input signals;
   a first power monitor configured to repeatedly measure a first power of the first circuit at a first frequency according to a first period, wherein the first power of the first circuit is measured based on the first input signals;
   a temperature sensor configured to repeatedly sense temperature of the device at a second frequency according to a second period that is longer than the first period; and
   a controller configured to:
      estimate a first temperature of the first circuit based on the first power at the first frequency according to the first period;
      receive a second temperature from the temperature sensor at the second frequency according to the second period;
      calculate a third temperature based on the first temperature and the second temperature; and
      repeatedly determine a circuit temperature of the first circuit at the first frequency according to the first period based at least in part on the first temperature and the third temperature.

2. The device of claim 1, wherein the controller is further configured to calculate a current first temperature based on at least one coefficient, the first power measured before the first period, currently measured first power, and a temperature of the first circuit determined before the first period.

3. The device of claim 2, further comprising a look-up table configured to store a plurality of coefficients corresponding to a plurality of combinations of operation parameters of the first circuit,
wherein the controller is further configured to identify operation parameters of the first circuit and receive the at least one coefficient from the look-up table based on the identified operation parameters of the first circuit.

4. The device of claim 2, further comprising a processor configured to execute a machine learning model trained by using a plurality of samples of operation parameters of the first circuit,
wherein the controller is further configured to identify operation parameters of the first circuit and receive the at least one coefficient by providing the identified operation parameters of the first circuit to the processor.

5. The device of claim 4, wherein the controller is further configured to provide the second temperature to the processor, and
wherein the processor is further configured to train the machine learning model based on the second temperature.

6. The device of claim 1, wherein the controller is further configured to calculate the third temperature by calculating a weighted sum of the first temperature and the second temperature.

7. The device of claim 6, wherein the controller is further configured to set a first weight and a second weight of the weighted sum based on a difference between the first temperature and the second temperature, wherein the first weight is multiplied by the first temperature in the weighted sum and the second weight is multiplied by the second temperature in the weighted sum.

8. The device of claim 1, further comprising:
a second circuit configured to operate based on second input signals; and
a second power monitor configured to measure a second power of the second circuit according to a third period, wherein the second power of the second circuit is measured based on the second input signals,
wherein the controller is further configured to estimate a third temperature of the second circuit based on the second power according to the third period, calculate a fourth temperature based on the third temperature of the second circuit based on the second temperature, and determine a circuit temperature of the second circuit according to the third period based at least in part on the third temperature and the fourth temperature, and
wherein the third period is shorter than the second period.

9. The device of claim 1, wherein the controller is further configured to control the temperature of the first circuit based on the determined circuit temperature of the first circuit and the first power.

10. A method comprising:
repeatedly measuring a first power of a first circuit based on input signals of the first circuit at a first frequency according to a first period;
estimating a first temperature of the first circuit based on the first power at the first frequency according to the first period;
repeatedly calculating a third temperature by repeatedly sensing a second temperature of a device comprising the first circuit and correcting the first temperature based on the second temperature at a second frequency according to a second period that is longer than the first period; and
repeatedly determining a circuit temperature of the first circuit at the first frequency based on the first temperature and the third temperature in one or more instances of the first period.

11. The method of claim 10, wherein the measuring of the first power comprises:
receiving at least one input signal, wherein the at least one input signal comprises one or more of a clock gating signal for controlling a clock signal provided to the first circuit and an enable signal for enabling or disabling the first circuit; and
identifying the first power based on at least one state of the at least one input signal.

12. The method of claim 11, wherein the estimating of the first temperature comprises:
collecting a plurality of values of the first power corresponding to a series of measurements; and
estimating the first temperature based on the collected plurality of values.

13. The method of claim 10, wherein the calculating of the third temperature comprises calculating a weighted sum of the first temperature and the second temperature as the third temperature.

* * * * *